Dec. 11, 1951     R. C. WRIGHT     2,578,650
INDUSTRIAL STOKER DRIVE

Filed April 28, 1947     8 Sheets—Sheet 1

INVENTOR
R. C. WRIGHT.
BY
ATTORNEY

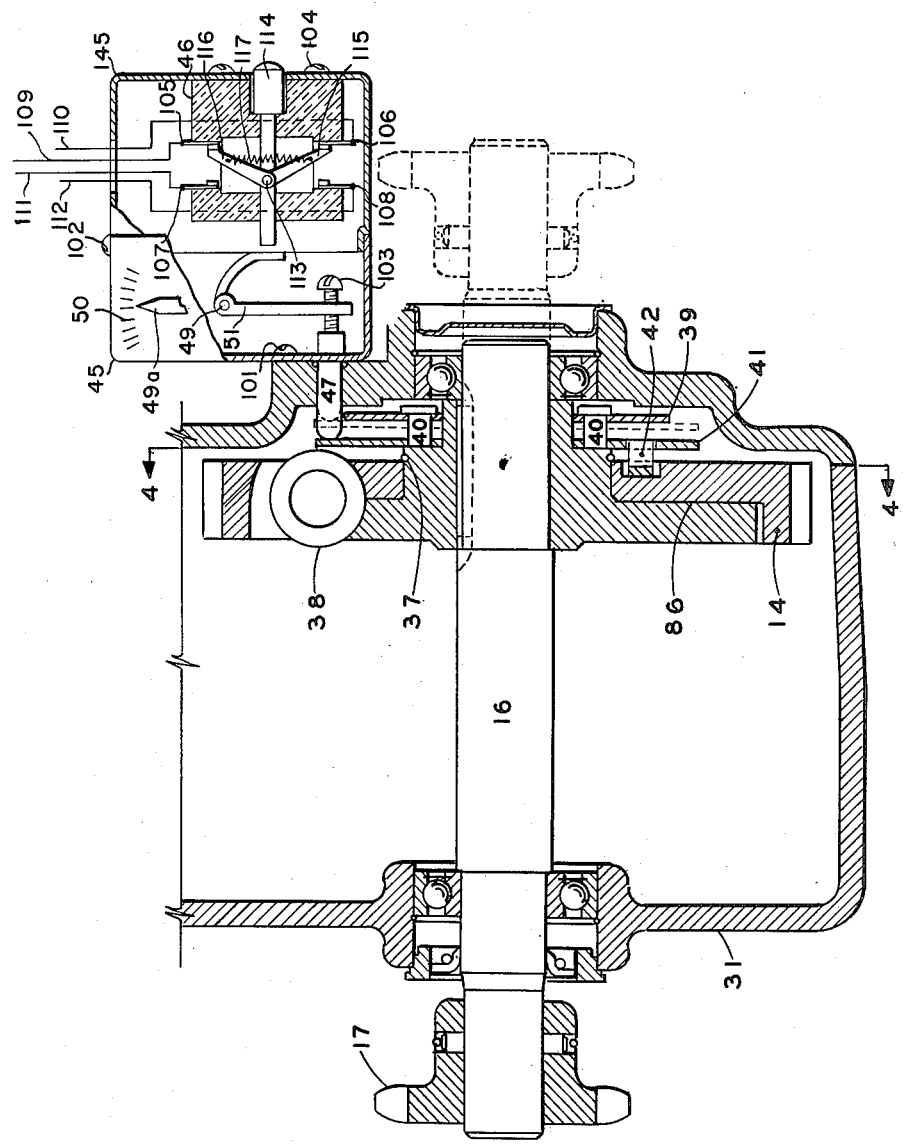

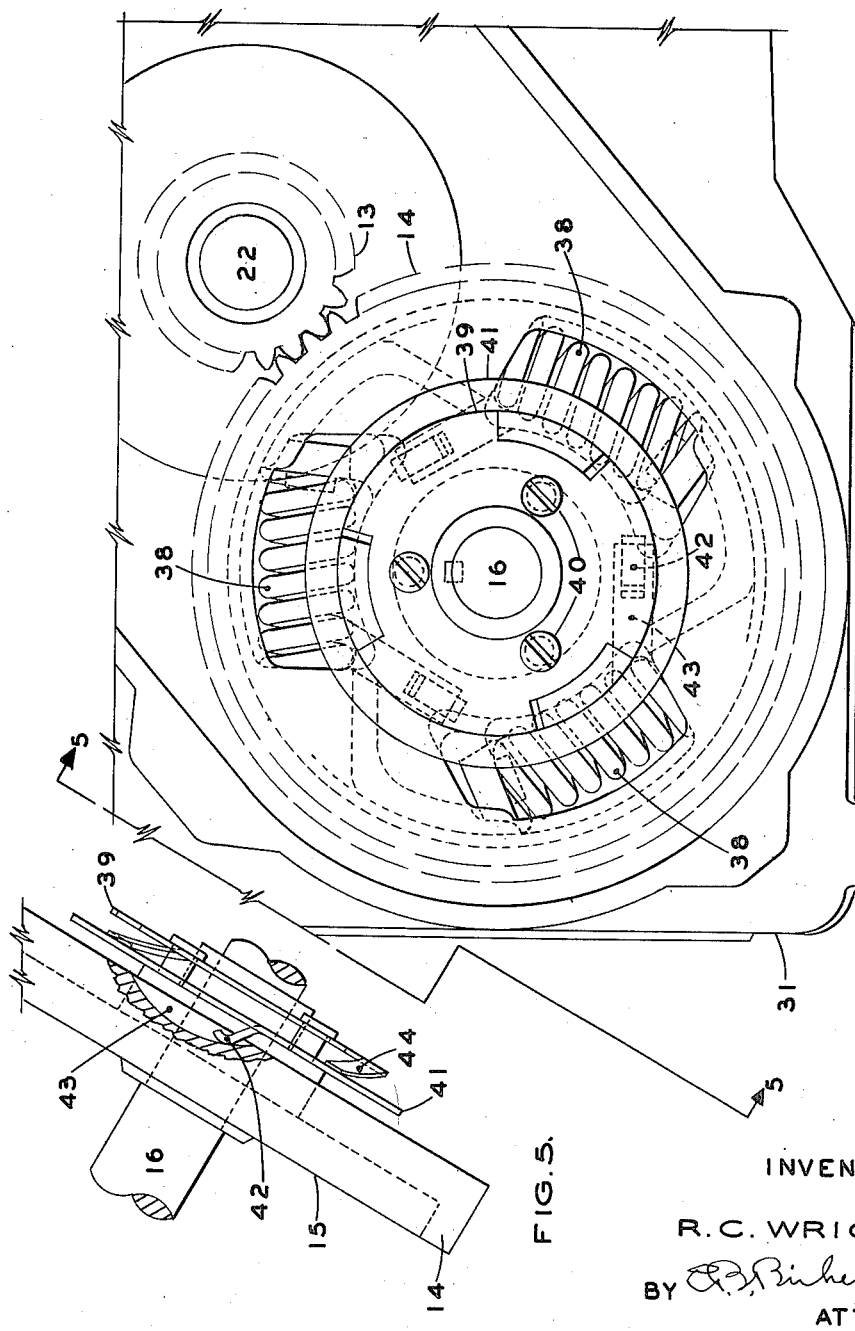

Dec. 11, 1951  R. C. WRIGHT  2,578,650
INDUSTRIAL STOKER DRIVE
Filed April 28, 1947  8 Sheets-Sheet 6

INVENTOR
R. C. WRIGHT.
BY [signature]
ATTORNEY

INVENTOR
R. C. WRIGHT.
BY
ATTORNEY

Dec. 11, 1951  R. C. WRIGHT  2,578,650
INDUSTRIAL STOKER DRIVE
Filed April 28, 1947  8 Sheets-Sheet 8

INVENTOR
R. C. WRIGHT.
BY
ATTORNEY

Patented Dec. 11, 1951

2,578,650

UNITED STATES PATENT OFFICE 2,578,650

INDUSTRIAL STOKER DRIVE

Richard C. Wright, Bay Village, Ohio, assignor to Iron Fireman Manufacturing Company, Portland, Oreg.

Application April 28, 1947, Serial No. 744,392

2 Claims. (Cl. 74—689)

This invention has for its object the improvements in industrial stoker drives herein set forth which among other things include an improved planetary type differential speed reducer of the V-belt controlled continuously variable type, the general type of which is set forth in the well-known French patent to M. Henri Mollard, Patent No. 804,694, issued October 29, 1936.

More particularly my invention provides an improved industrial stoker drive comprising in combination an improved planetary differential type speed reducer, an improved V-belt and expanding sheaves control therefore and an improved emergency unloader, thus providing a novel unitary mechanism of great utility which has previously been lacking in this field.

This type of variable V-belt controlled differential transmission operates as a so-called "torque-converter" and within the limits of the gearing efficiency and the endurance of the V-belt control this type of mechanism can become a highly efficient and easily controlled continuously variable speed reducer. It is an object of my invention to provide such high mechanical efficiency and ease of control combined with a unique unloader to prevent its destruction in case of excessive overloading and torque conversion.

It should be understood that a stoker drive gear set is for the purpose of reducing the high rotating speed of the electric motor used to drive it to the very low speed (say of the range of 0 to 20 R. P. M.) required to operate the coal feeding screw of the stoker. When a stoker transmission having one or more definite speeds available is used, settings of the damper for control of combustion air can be established so that whenever the fuel feed is changed manually or otherwise, the companion air setting can be made manually or otherwise. But with a continuously variable fuel feed transmission as shown herewith it is desirable to provide a continuously variable air supply control to operate in synchronism with it. Providing such a continuously variable air control and combining it with the fuel control for synchronous variation is another desirable object of this invention.

These and other objects are accomplished in the manner set forth in the following specifications, as illustrated in the accompanying drawings wherein:

Fig. 3 is a fragmentary transverse section along the line 3—3 of Fig. 1.

Fig. 4 is a view along the line 4—4 of Fig. 3.

Fig. 5 is a fragmentary view along the line 5—5 of Fig. 4.

Figure 1:
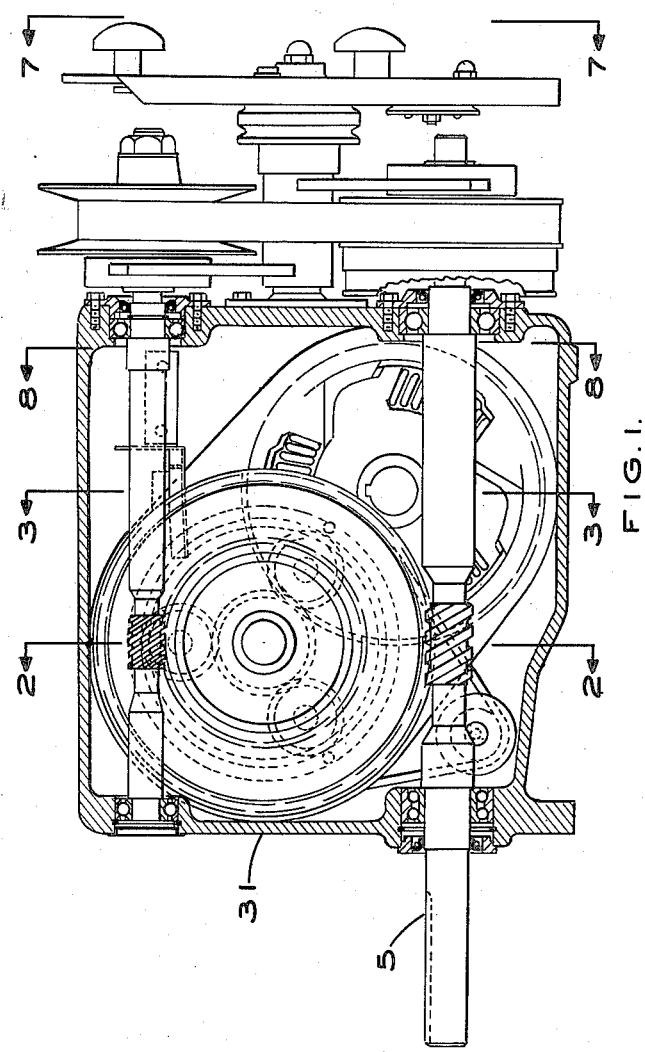
Fig. 1 is a part sectional side view of my transmission.
Figure 2:
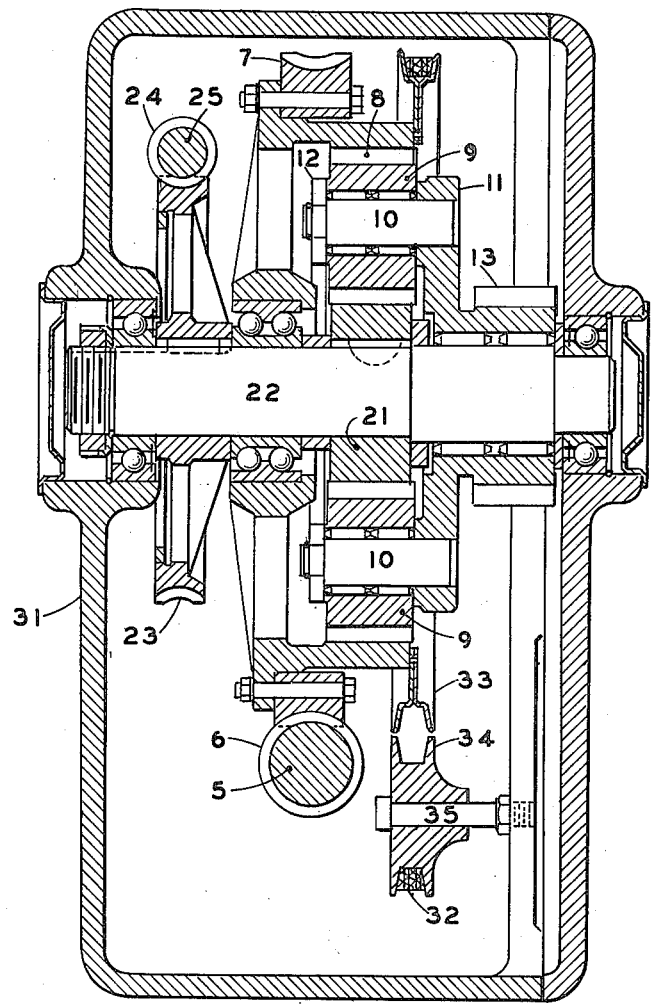
Fig. 2 is a transverse section along the line 2—2 of Fig. 1.
Figure 6:
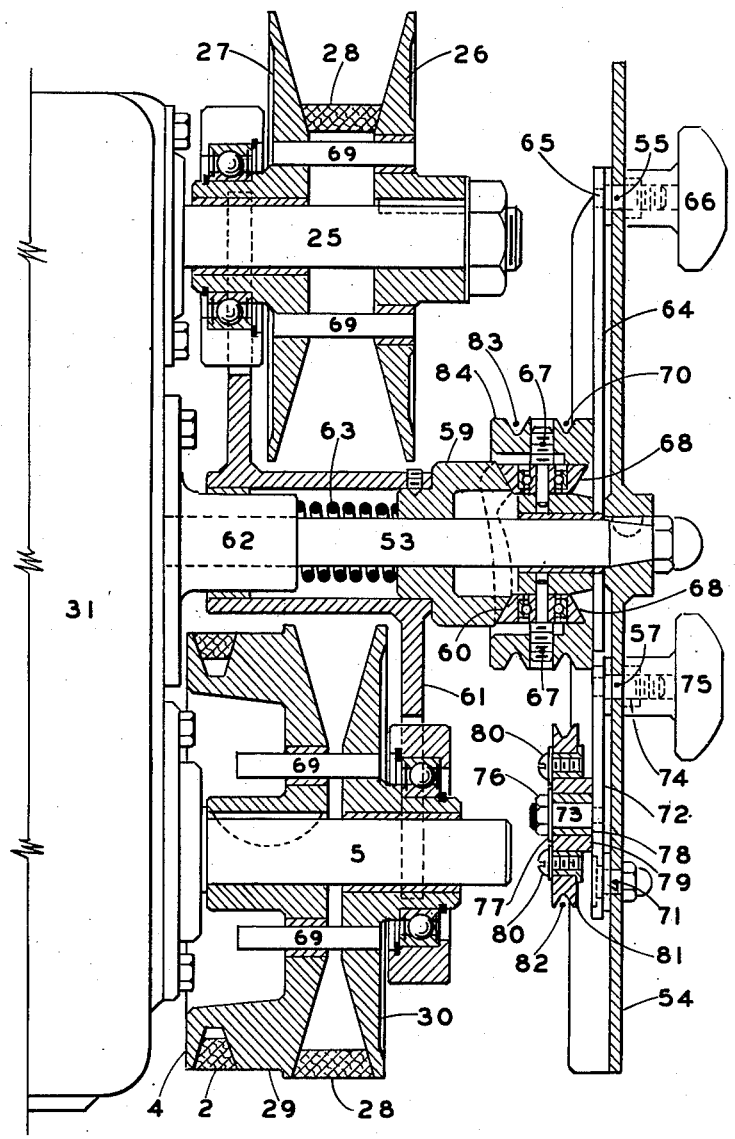
Fig. 6 is a sectional view of my V-belt and expanding sheave control shown in side elevation on the right end of Fig. 1.
Figure 7:
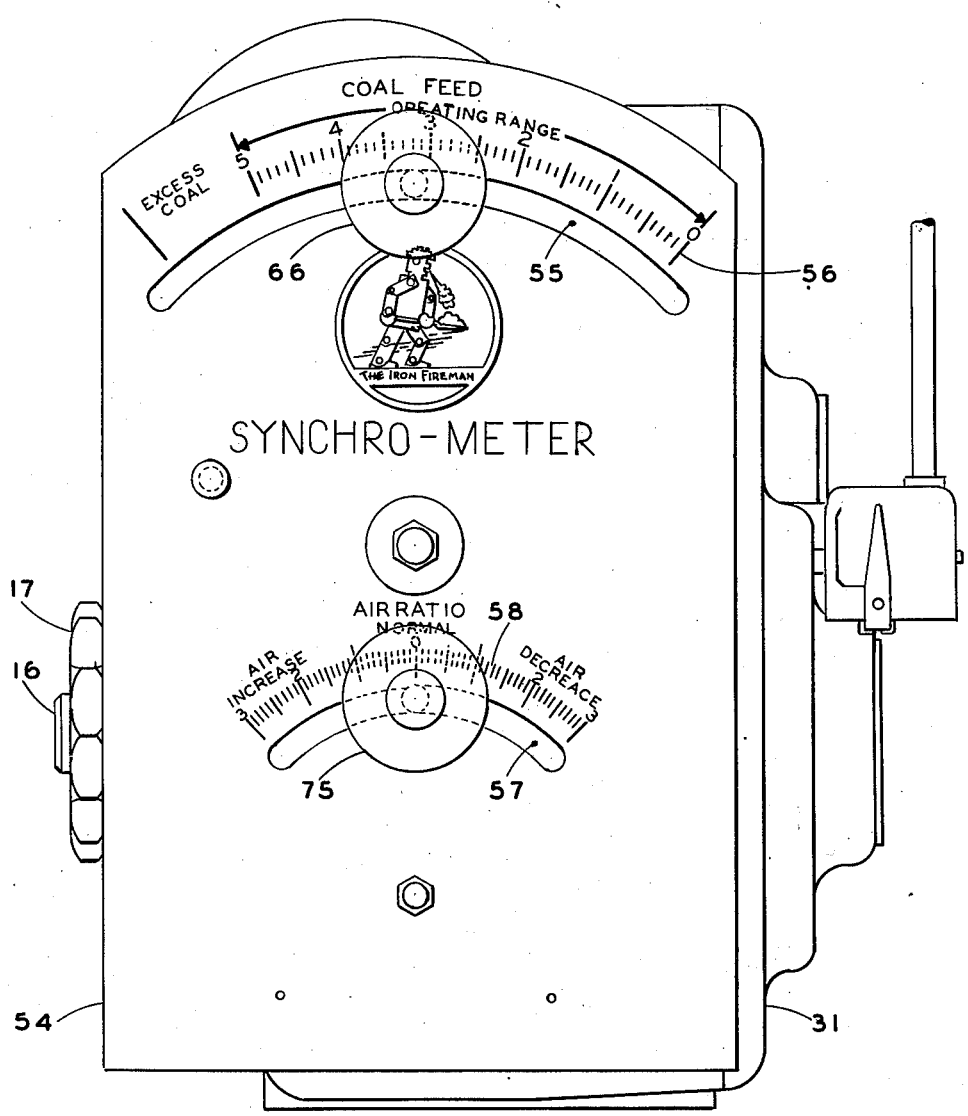
Fig. 7 is an end view of my control along the line 7—7 of Fig. 1.
Figure 8:
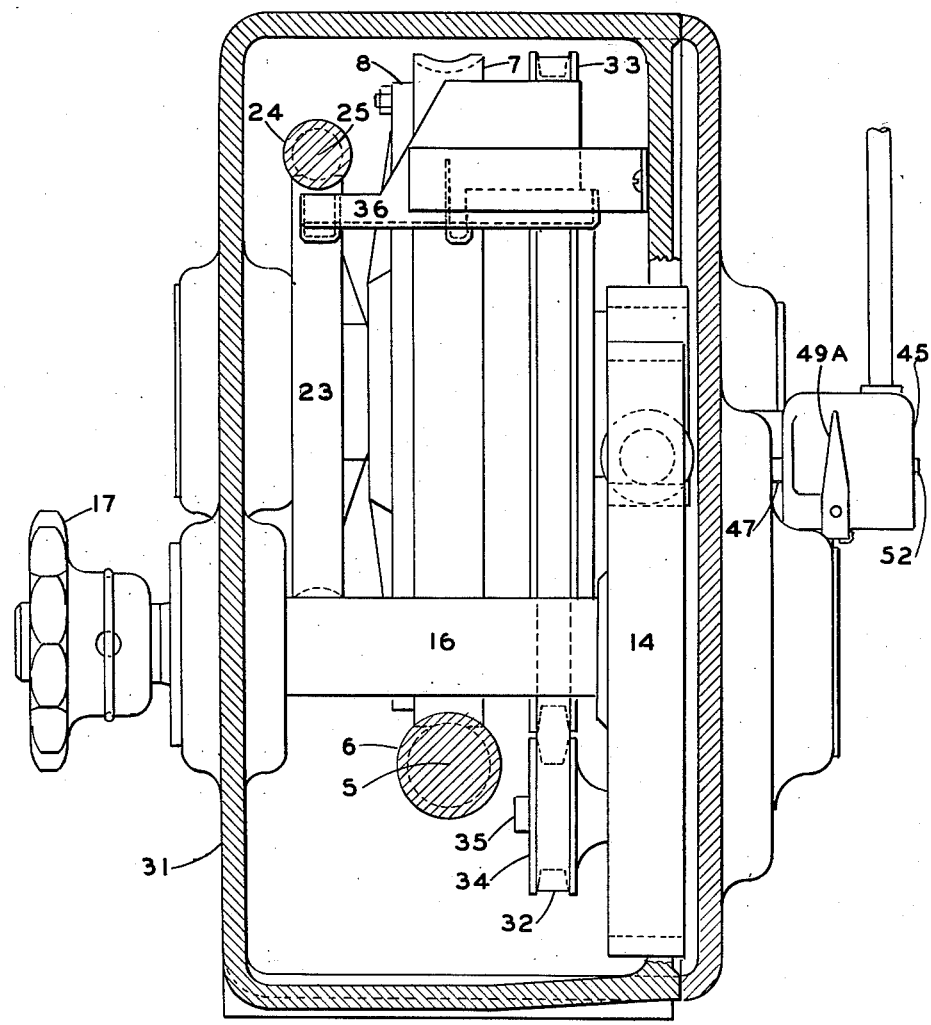
Fig. 8 is an interior view of my transmission along the line 8—8 of Fig. 1.

Referring now to the drawings, at 1 is shown an electric motor assumed to be connected to a power line, not shown, through a magnetic switch, not shown. By means of V-belt 2 and sheaves 3 and 4 motor 1 drives the input shaft 5 on which is fixed worm 6 mating with worm gear 7 carried on differential ring gear 8 meshing with planet gears 9 rotatably supported on pins 10 fixed in planet cage 11—12 to which is fixed concentric pinion 13 which meshes with gear 14 carried concentrically by hub 15 to which it is yieldingly attached. Hub 15 is keyed to shaft 16 to which is pinned chain sprocket 17 which drives chain sprocket 18 through roller chain 19. Sprocket 18 is secured to the feed screw 20 of the stoker coal feeding conveyor, not shown.

Sun pinion 21 keyed to shaft 22 rotates with worm gear 23 also keyed to shaft 22. Worm gear 23 meshes with worm 24 on shaft 25 to which is secured the fixed half 26 and on which slides the movable half 27 of an expanding sheave coupled through V-belt 28 to another expanding sheave whose fixed half 29 is secured to shaft 5 and whose movable half 30 slides on shaft 5.

Shafts 5, 16, 22 and 25 are carried on bearings in the housing 31 as shown. Ring gear 8 and planet cage 11—12 are rotatably carried on shaft 22 as shown.

A loose chain 32 driven by sheaves 33 and idling on idler 34 carried on stud 35 in case 31 drags lubricating oil from the lower end of case 31 which carries oil enough to contact worm 6. The lubricating oil carried by chain 32 is thrown by centrifugal force into oil trough 36 supported on case 31 and is led to drip on worm gear 23 thus effectively lubricating worm 24 and worm gear 23.

Gear 14 mates with hub 15 along the line 86 and is held in axial position by snap-ring 37 set in a groove in hub 15. While gear 14 is capable of rotary motion with respect to hub 15, it is yieldingly restrained from such motion by coil springs 38 located in recesses formed in parts 14 and 15, one end of each spring abutting gear 14 and the other end abutting hub 15 so that the rotary motion of gear 14 is transmitted to hub 15 by springs 38 and the compression of springs 38 and therefore the angular lag of hub 15 behind gear 14 is proportional to the torque transmitted from shaft 22 to shaft 16 through pinion 13, gear 14, springs 38 and hub 15. Fixed to hub 15 is disk 39 carrying guide pins 40 for axially movable disk 41 whose axial position is determined by rigid riders 42 formed offset from disk 41 riding in grooves 43 of variable depth sunk in the face of gear 14. Holding riders 42 against the bottom of grooves 43 are spring fingers 44 formed offset from disk 39 and pressing against disk 41. The axial position of disk 41 is therefore determined by the relative angular positions of gear 14 and hub 15 and in consequence by the torque transmitted from shaft 22 to shaft 16.

Fixed to case 31 by screws 101 is two part switch box 45 and 145 secured together by screws 102. Journalled in opposite sides of part 45 is fulcrum pin 49 to which, inside part 45, is secured the bent lever 51 having adjusting screw 103 threaded into one end thereof in alignment with rod 47. Secured inside box part 145 by screws 104 is two circuit snap acting toggle switch having insulating body 46 into which are set terminals 105 and 106 of one circuit designed to be connected by wire 109, 110 into the holding coil circuit of the magnetic switch connecting motor 1 to its power supply. Also into body 46 are set terminals 107, 108 of a second circuit designed to be connected by wires 111, 112 into an alarm or signal circuit. Rotatably mounted on pin 113 carried by switch stem 114 are toggle switch levers 115 and 116. Strained between pins carried by levers 115 and 116 is conducting tension spring 117 which, depending on the position of stem 114, will always urge the outer ends of levers 115, 116 against terminals 105, 106 to complete the holding coil circuit or against terminals 107, 108 to complete the alarm circuit. Due to the reaction of the inner ends of levers 115, 116, on pin 113, because of the strain of spring 117 when the outer ends of levers 115, 116 are pressed against terminals 105, 106, pin 113 urges stem 114 to press against the other end of bent lever 51 and thus cause adjusting screw 103 threaded into the one end of lever 51 to press rod 47 against disk 41. The amount of lateral movement of disk 41 required to cause the switch to open the holding coil circuit and close the alarm circuit is adjusted by screw 103. Indicator 49-a secured to pin 49 outside of box 45 has its pointed end adjacent scale 50 to indicate the position of lever 51.

A particularly desirable and novel characteristic of the above described over-load release is that its elements are designed so that its operating range for operating switch 46 is confined to the initial part of the possible compression of springs 38 so that there is considerable amount of compressibility remaining in springs 38 after motor 1 has been de-energized by the operation of switch 46 thus relieving the mechanism of inertia shock which might otherwise occur due to the small but measurable time delay between the occurrence of the over-load condition and the de-energizing of the motor and the absorption by the transmission of the rotating energy of the moving motor and transmission parts. Carried in switch box 45 is push button 52 which at any time can be manually operated to push switch 46 in the direction of disk 41 and therefore operate switch 46 to stop motor 1.

Rigidly secured to case 31 and parallel with shafts 5 and 25 is shaft 53 to which is rigidly secured at its outer end indicator plate 54 having at its upper end arcuate slot 55 and scale 56 to indicate the relative speed of the output shaft of the transmission in terms of whatever use to which the transmission is put—in this the coal feed of the stoker. Below the center of indicator plate 54 it is perforated by arcuate slot 57 and carries scale 58 for indicating and adjusting the air-fuel ratio of the stoker in a manner to be described.

Figure 9:
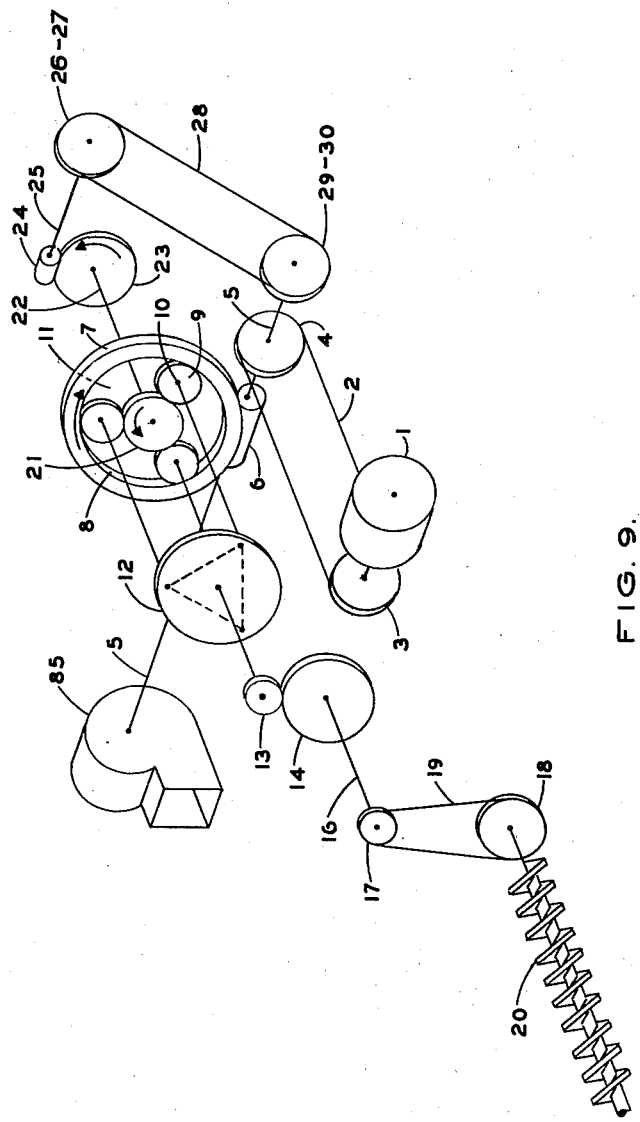
Fig. 9 is a skeletonized view in perspective showing the mechanical scheme of my fuel feeding transmission.

Axially slidable on dead shaft 53 is hub 59 having cam face 60 and carrying Z-frame 61 also guided on hub 62 of case 31. Around shaft 53 and abutting hubs 59 and 62 is compression spring 63 continuously urging Z-frame and cam away from case 31. Journalled on shaft 53 is two-groove sheave 84 restrained in both axial and angular movement by lever arm 64 one end of which is journalled on shaft 53 and whose other end carries stud 65 extending through slot 55 in plate 54 to which arm 64 may be clamped by knob 66 threaded on stud 65. Rotatably carried on studs 67 in sheaves 84 are two diametrically opposed conical cam followers 68 which by the angular position of sheaves 84 or arm 64 determine the axial position of Z-frame 61. The ends of Z-frame 61 are secured respectively to the outer races of ball bearings whose inner races are secured as shown to the hubs of movable half sheaves 27 and 30. Movable half sheaves 27 and 30 rigidly support pins 69 which slidably engage fixed half sheaves 26 and 29 causing movable half sheaves 27 and 30 to maintain constant angular relations with their respective fixed half sheaves 26 and 29.

Where a stoker supplies coal to a combustion chamber air must also be supplied at a rate synchronized with the coal feed rate and the air supply may be through a fan driven separately from the coal feed drive or the fan 85 may be connected directly to the coal feed drive through shaft 5 as indicated in Fig. 9. In this case as shown in Fig. 1, both ends of shaft 5 extend to the outside of case 31 one end carrying drive and regulating sheaves and the other end carrying the fan wheel. But whatever the source of combustion air the control will preferably be by an automatic air regulating damper mechanism of the type developed along the lines of U. S. Patents 2,116,912, 2,108,873 and 2,149,934, the use of which patents is available to me. In these patents it is shown that any desired rate of air feed for which the control is set will be strictly maintained and that the rate of air fed may be smoothly varied simply by varying the setting of the air rate indicating quadrant or lever of the air control. To synchronize such an air control with my present stoker drive the setting arm or quadrant of the air control is biased by means of a spring or weight towards its less air limit and a tiller rope or cable is attached to the quadrant to move it against the force of the spring. This tiller rope or cable guided by the necessary idler sheaves is brought from the air control quadrant and approaches the transmission in the plane of groove 70 in sheaves 84.

Hinged on plate 54 by journal 71 is air adjustment lever arm 72 carrying stud 73 intermediate its ends and stud 74 at its upper end. Stud 74 extends through slot 57 in plate 54. Knob 75 threaded on stud 74 clamps arm 72 in any desired angular position. Nut 76 and washer 77 clamp bushing 78 securely against arm 72. Rotatably mounted on bushing 78 is eccentric bushing 79.

Adjustably secured by screws 80 to eccentric bushing 79 is eccentric rim 81 on the circular periphery of which is formed sheave groove 82 in the plane of groove 70 of sheave 84. Eccentric 79 and eccentric 81 have the same maximum eccentricity so that by relative adjustment of these two parts groove 82 may be concentric with stud 72 or can have an eccentricity thereto equal to the sum of the eccentricities of parts 79 and 81.

The tiller rope leading from the air damper control adjustment quadrant is led around under rim 81 in groove 82 and after wrapping partially around sheave 84 in groove 70 is secured to sheave 84 in such a manner that when sheave 84 is rotated the tiller cable wraps or unwraps respectively and thus adjusts the air control synchronously with the coal feed control. As the tiller rope moves with the rotation of sheave 84 it rotates eccentric idler rim 81 which is adjusted to compensate for the adjustment characteristic of the air control in order that true synchronism is established between the coal feed control and the air control when arm 72 is at the central or "normal" air ratio position of scale 58 on plate 54. Knob 75 is used to bias the air feed rate against the coal feed rate for various reasons found in the practical operation of industrial stokers.

Groove 83 of sheave 84 is provided for remote control by tiller rope of coal feed and air feed synchronously. When this means of remote control is used, knob 66 is either left in a loosened condition or removed entirely.

Having thus fully described the mechanisms by means of which I have attained the previously stated objects of my invention, it is clear that many variations of the shown constructions are feasible. Therefore, I do not intend to be limited by the constructions shown but desire to preserve the full scope of my invention and

I claim:

1. A stoker coal feed transmission of the V-belt controlled planetary differential type comprising an enclosing case, said case having two spaced parallel first sides and two spaced parallel other sides substantially at right angles to said first sides, a shaft journalled in said first sides, a sun pinion fixed to said shaft, a planet gear cage riding said shaft, an internal ring gear riding said shaft, planet gears rotatably carried by said planet cage and meshing with both said sun pinion and said ring gear, a first worm gear keyed to said shaft, a first worm shaft journalled in said other sides of said case, said first worm shaft having its worm meshing with said first worm gear, a second worm gear secured to said ring gear, a second worm shaft journalled in said other sides of said case and having its worm meshing with said second worm gear, said first and second worm shafts extending through the same side of said case, means outside said case for driving one of said worm shafts, means for adjusting the relative speeds of said worm shafts when said shafts are in motion, a second shaft journalled in said sides of said case parallel to said shaft, a pinion fixed to said planet cage, a hub fixed to said second shaft, a rim gear journalled on said hub and meshing with said pinion, resilient means connecting said rim gear with said hub, and means carried on said hub and operated by said rim gear for indicating the limit of torque to be applied to said hub by said rim gear.

2. A stoker coal feed transmission of the V-belt controlled planetary differential type comprising, an enclosing case, said case having two spaced parallel first sides and two spaced parallel other sides substantially at right angles to said first sides, a shaft journalled in said first sides, a sun pinion fixed to said shaft, a planet gear cage riding said shaft, an internal ring gear riding said shaft, planet gears rotatably carried by said planet cage and meshing with both said sun pinion and said ring gear, a first worm gear keyed to said shaft, a first worm shaft journalled in said other sides of said case, said first worm shaft having its worm meshing with said first worm gear, a second worm gear secured to said ring gear, a second worm shaft journalled in said other sides of said case and having its worm meshing with said second worm gear, said first and second worm shafts extending through the same side of said case, means outside said case for driving one of said worm shafts, and means for adjusting the relative speeds of said worm shafts when said shafts are in motion, said relative speed adjusting means comprising a V-belt, a V-belt sheave on each of said worm shafts, each of said sheaves being separable for relative movement of its two belt riding cheeks, one of said sheaves having its left hand half fixed to one of said worm shafts and its right hand half adapted to slide on said one of said worm shafts, the other of said sheaves having its right hand half fixed to the other of said worm shafts and its left hand half adapted to slide on said other of said worm shafts, a support fixed relative to said enclosing case, a frame carried on said support for movement parallel with the axes of said worm shafts, means adapting said frame to control the movement of said movable halves of said sheaves axially of said worm shafts, means biasing said frame axially of said worm shafts, and adjustable means for opposing said biasing means to position said frame.

RICHARD C. WRIGHT.

REFERENCES CITED

The following references are of record in the file of this patent:

UNITED STATES PATENTS

| Number | Name | Date |
|---|---|---|
| 1,324,952 | Bird | Dec. 16, 1919 |
| 1,702,479 | Mosch | Feb. 19, 1929 |
| 1,702,627 | Bronander | Feb. 19, 1929 |
| 1,926,269 | Easter | Sept. 12, 1933 |
| 1,996,849 | Bauer | Apr. 9, 1935 |
| 2,201,357 | Twomley | May 21, 1940 |
| 2,259,823 | Locke | Oct. 21, 1941 |
| 2,299,727 | Blauvelt | Oct. 27, 1942 |
| 2,322,719 | Scott | June 22, 1943 |
| 2,393,680 | Hallinan | Jan. 29, 1946 |
| 2,443,075 | Locke | June 8, 1948 |

FOREIGN PATENTS

| Number | Country | Date |
|---|---|---|
| 804,694 | France | Aug. 10, 1936 |